Oct. 13, 1953   F. A. SHERMAN   2,655,611
ALTERNATING CURRENT GENERATOR
Filed Jan. 13, 1951   2 Sheets-Sheet 1
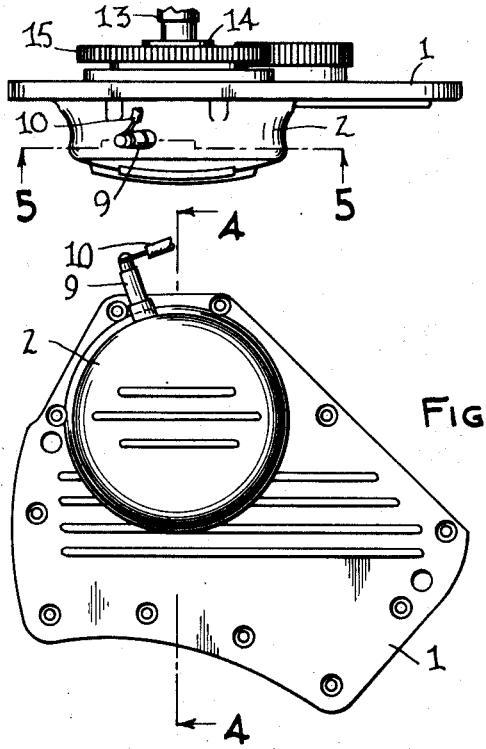
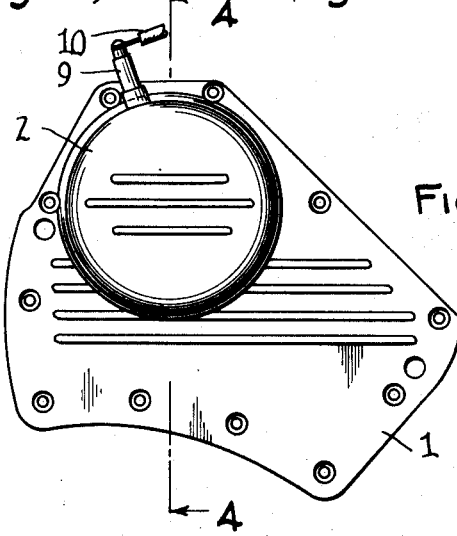
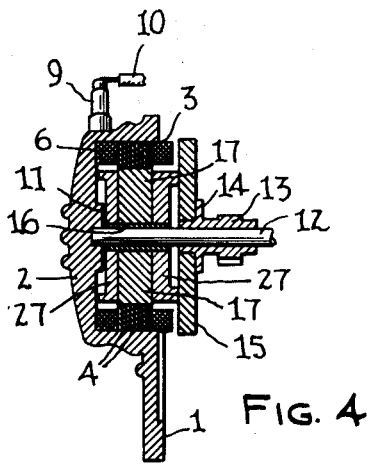
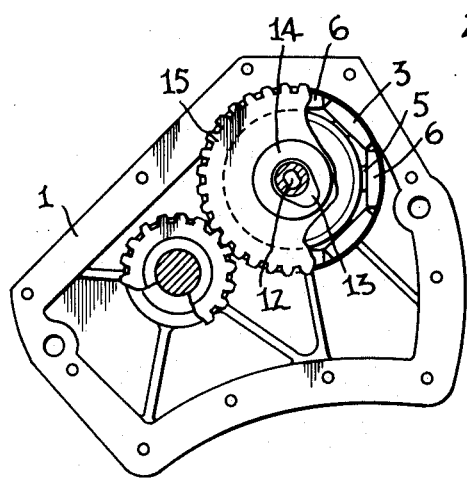
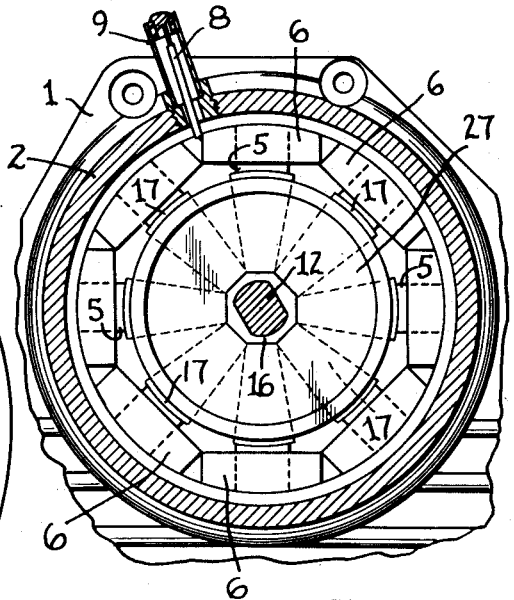
INVENTOR.
FLOYD A. SHERMAN
BY
William Isler
ATTORNEY

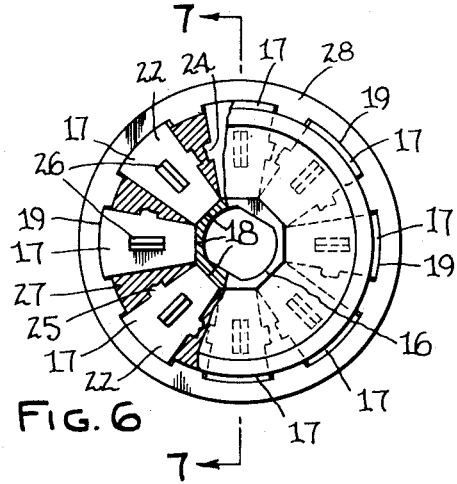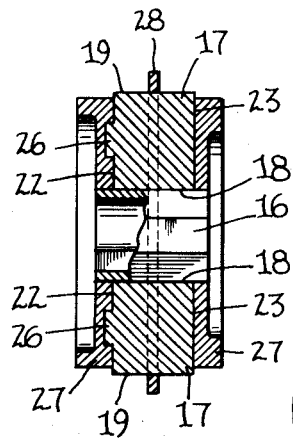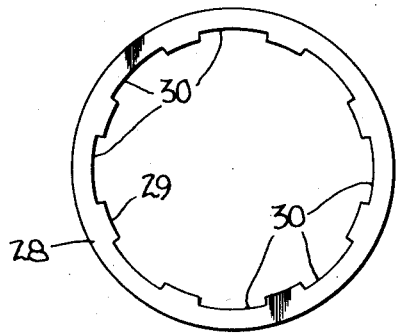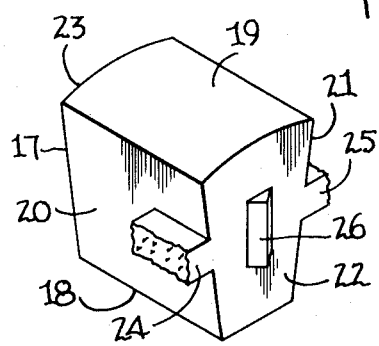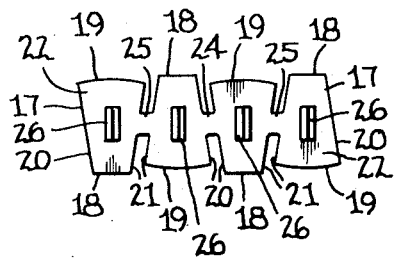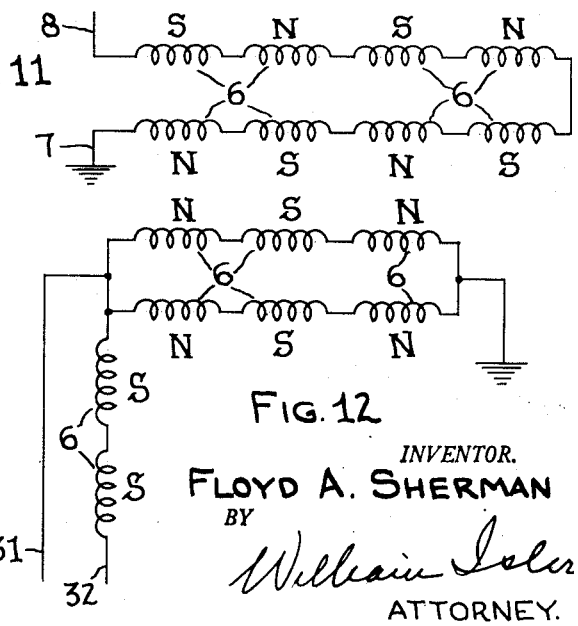
INVENTOR.
FLOYD A. SHERMAN
BY
William Isler
ATTORNEY.

Patented Oct. 13, 1953

2,655,611

UNITED STATES PATENT OFFICE 2,655,611

ALTERNATING CURRENT GENERATOR

Floyd A. Sherman, Birmingham, Mich., assignor to Whizzer Motor Company, Pontiac, Mich., a corporation of Delaware Application January 13, 1951, Serial No. 205,927

3 Claims. (Cl. 310—42)

1

This invention relates, as indicated, to an alternating current generator, but has reference more particularly to a novel construction of rotor for such a generator, and to a method of making said rotor.

A primary object of the invention is to provide a rotor of the character described, through the use of which a magnetic field of maximum efficiency is obtainable, with the smallest possible diameter of the rotor.

Another object of the invention is to provide a rotor of the character described, of extremely simple construction, consisting of parts which can be quickly and inexpensively cast, and easily assembled to form a unitary structure, the component portions of which are effectively locked against displacement from each other.

A further object of the invention is to provide a novel method of assembling or making the aforesaid rotor.

Other objects and advantages of my invention will be apparent during the course of the following description. In the accompanying drawings forming a part of this specification and in which like numerals are employed to designate like parts throughout the same, Fig. 1 is a side elevational view of the generator, showing the generator housing side plate;

Fig. 2 is a top plan view of the generator and side plate;

Fig. 3 is a side elevational view of the side of the generator and housing reverse to that shown in Fig. 1;

Fig. 4 is a fragmentary cross-sectional view, taken on the line 4—4 of Fig. 1;

Fig. 5 is a fragmentary cross-sectional view, taken on the line 5—5 of Fig. 2;

Fig. 6 is a front elevational view of the rotor of the generator, showing the magnet retaining ring in operative position;

Fig. 7 is a cross-sectional view taken on the line 7—7 of Fig. 6;

Fig. 8 is a front elevational view of the magnet retaining ring;

Fig. 9 is an elevational view showing the preferred multiple or group form in which the magnets are cast;

Fig. 10 is a perspective view, showing a single magnet;

Fig. 11 is a diagram showing the arrangement of the generator coils under certain conditions of use of the generator, and Fig. 12 is a diagram showing the arrangement of the generator coils for another condition of use of the generator.

2

Referring more particularly to the drawings, I have shown a generator which I have designed particularly for use in generating the current required for certain purposes on a gasoline engine driven bicycle, but it is to be understood that the generator has a much wider range of application or use than this specific application.

In the drawings, reference numeral 1 represents the generator housing side plate, preferably made in the form of an aluminum casting, having a cylindrical protuberance 2 forming a housing for portions of the generator to be presently described.

Disposed within the protuberant portion 2 of the side plate is a stator ring 3, which consists of a series of laminations 4 of annular form, having a multiplicity of circumferentially-spaced, radially-inwardly extending poles 5. For the special purposes of the present invention, these laminations are preferably stamped or molded from pure iron, as for example, the type of iron commonly known as Armco ingot iron.

Coils 6 are wound around each of the poles 5, and these coils are suitably electrically insulated from each other, as well as from the stator in any well-known manner, which need not be described, varnished insulating papers being generally available for this purpose. In this particular case, the coils 6, as shown in Fig. 11, are connected in series with each other, one terminal 7 of the connecting wire being grounded to the housing 1, and the other terminal 8 of the connecting wire extending through a terminal housing 9 which extends radially from the portion 2 of the side plate.

A wire 10 is connected to the terminal 8 and supplies current for the operation of various accessories, such for example, as the head lamp, tail lamp, ignition system for the gasoline engine, horn and radio. This series arrangement of the generator coils is designed for a constant load requirement.

The casting forming the housing side plate is also provided centrally of the protuberance 2 with a hub 11, in which is journalled one end of a shaft 12, which extends axially through the stator housing and has rigidly secured thereto a cam shaft 13 provided with an annular flange 14 which abuts one face of a timing gear 15 which is keyed or otherwise non-rotatably secured to the cam shaft 13.

Secured on the shaft 12, between the hub 11 and timing gear 15, is the generator rotor, which comprises a core 16 of octagonal external cross-section. This core is preferably made from compressed powdered metal, the preferred analysis being that of SAE 1018 H. R. steel.

The rotor further comprises a multiplicity of magnetic pole-pieces or magnets 17, each magnet being wedge-shaped, and having a radially-inward flat face or base 18 in contact with one of the flat outer faces of the core 16, a radially-outer face 19 of arcuate cross-section in a direction circumferentially of the rotor, converging side faces 20 and 21, and parallel flat front and rear walls or faces 22 and 23.

The faces 20 and 21 are respectively provided with protuberant lugs 24 and 25 which extend substantially parallel with the base 18 and from the front face 22 to a point substantially midway between the faces 22 and 23. The face 22 is provided with a third lug or protuberance 26 of V-shaped cross-section extending centrally along the face 22 and radially with respect to the rotor as a whole. The lug or protuberance 26 is also disposed midway between the faces 18 and 19 of the magnet. The lugs 24, 25 and 26 serve a purpose to be now described.

The magnets 17, of which there are eight in number, corresponding to the number of poles 5 of the stator, are preferably made from a highly magnetic alloy, known at Almco VI.

The magnets 17 are permanently maintained in proper circumferentially spaced relation to each other and in contact with the flat faces of the core 16 by means of a cage 27, formed by die casting metal, as for example, Alcoa's 85X or Federated F430. This cage not only fills the spaces between the magnets 17, but also covers the front and rear faces, 22 and 23, of each magnet.

In order to maintain the magnets in assembled relation with the core 16 during the process of pouring the cage 27, i. e., assembling the rotor, a sheet metal magnet retaining ring 28 is provided, which is disposed about the magnets in the manner shown in Fig. 6. The ring 28 has formed in its inner peripheral edge 29 a multiplicity of uniformly spaced shallow recesses 30, equivalent in number to the number of magnets 17 and of a length substantially the same as the length of the faces 19 of the magnets, these recesses receiving the outer peripheral portions of the magnets. The ring 28 thus functions to retain the magnets in properly assembled relation, both with respect to each other and with respect to the core 16, during the pouring of the cage or matrix 27.

After the cage 27 has been cast, and has solidified, the retaining ring 28, which is no longer required, may be easily slipped off the assembled rotor by a simple axial movement thereof.

During the casting of the cage 27, the lugs 24, 25 and 26 become embedded in the material of the cage, and are thus effective to prevent displacement of the magnets both circumferentially and radially with respect to the cage during handling and use of the rotor.

For convenience in casting the magnets and at the same time providing them with the lugs 24 and 25, they may be cast in groups of multiples of four, connected together, as shown in Fig. 9. This also facilitates shipping. Upon arrival at the assembling station, they are broken apart, so that the connecting webs or sprues form the lugs of the individual magnets.

The faces 19 of the magnets extend tthrough an arc which is somewhat longer than the arc of the faces of the poles 5, this arc being approximately the same as the arcuate distances between the radially-innermost ends of the poles 5.

The rotor which has been described has been designed especially with a view to obtaining the most efficient magnetic field possible, with the smallest possible diameter.

By using pure iron, or an equivalent metal or alloy as the stator of the generator or alternator, and with the electrical field which has been described, I am able to control the voltage, under load, of the generator, irrespective of any increase in the generator shaft speed.

The present generator, for example, has a shaft speed which may vary from 500 to 3000 R. P. M. The voltage developed by the generator under these varying speed conditions does not drop below 6 volts and does not exceed 7.2 volts. With the rotor which has been described, magnetic flux reversals of approximately 66 per second are developed by the generator, so that the steel selected must be reluctant to flux reversals of over $1/66$ of a second in duration. The coils of the stator are designed to carry the required current, which will also set up eddy currents in the stator steel. When the speed of the generator shaft increases, the voltage and frequency also increase, but as the steel stator receives this increasing frequency, it sets up stronger eddy currents, suppressing or controlling the voltage. The frequency of this generator, at top speed of 3000 R. P. M., is approximately 200 cycles per second.

In Fig. 12, I have shown a modified arrangement of the coils 6, in which the terminal 31 is connected to an intermittent heavy load, such as the horn or radio, and the terminal 32 is connected to a constant light load, such as the headlamp, tail lamp and ignition system.

It is to be understood that the form and construction of the rotor, and the method of assembling or manufacturing same, herein shown and described, are to be tatken as preferred examples, and that various changes in the shape, size and arrangement of parts, and in the steps of manufacturing and assembling same, may be resorted to, without departing from the spirit of my invention, or the scope of the subjoined claims.

Having thus described my invention, I claim:

1. The method of making a rotor of the character described, said method comprising the steps of providing a central core, arranging poles in circumferentially-spaced relation and in abutment with said core, retaining said poles in said relation by means of a one-piece retaining ring embracing the radially-outermost faces of said poles and removable from said poles by axial movement from the poles, pouring a non-magnetic metal in the interstices between said poles and against the front and rear faces of the poles to permanently retain said poles in said relation, and removing said retaining ring by axial movement from the poles after said non-magnetic metal has solidified, the axial length of said retaining ring being very small in relation to the axial length of said pole faces, whereby ot facilitate removal of the retaining ring by said axial movement.

2. In an alternating current generator of the character described, a permanent magnet rotor comprising a casting of non-magnetic material having end faces normal to the axis of the rotor, a central core, the ends of which are substantially flush with the end faces of the casting, and a plurality of circumferentially-spaced magnets embedded in said casting and extending radially outwardly from said core through said casting, each of said magnets having a progressively increasing cross-sectional area which ranges from a minimum at the radially-innermost end of said magnets to a maximum at the radially-outermost ends of said magnets, the radially-outermost end of each magnet being exposed and uncovered by said casting, said casting constituting means for maintaining the magnets in circumferentially-spaced relation and in contact with said core.

3. A generator, as defined in claim 2, in which the magnets are provided with protuberant portions embedded in said casting and effective to prevent displacement of the magnets radially and circumferentially relatively to said casting.

FLOYD A. SHERMAN.

References Cited in the file of this patent

UNITED STATES PATENTS

| Number | Name | Date |
|---|---|---|
| 1,360,165 | Zenk | Nov. 23, 1920 |
| 1,360,166 | Zenk | Nov. 23, 1920 |
| 1,898,929 | Apple | Feb. 21, 1933 |
| 1,991,046 | Bohli | Feb. 12, 1935 |
| 2,468,146 | Vissing | Apr. 26, 1949 |
| 2,475,776 | Brainard | July 12, 1949 |
| 2,516,901 | Morrill | Aug. 1, 1950 |